US009229217B2

(12) United States Patent
Laabs et al.

(10) Patent No.: US 9,229,217 B2
(45) Date of Patent: Jan. 5, 2016

(54) OPTICAL MEASURING SYSTEM

(71) Applicant: Trimble Jena GmbH, Jena (DE)

(72) Inventors: Steffen Laabs, Jena (DE); Michael Vogel, Schleifreisen (DE); Wolfgang Hahn, Bürgel (DE); Thomas Korn, Jena (DE); Mario Fischer, Jena (DE); Michael Kötzing, Jena (DE)

(73) Assignee: Trimble Jena GmbH, Jena (DE)

( * ) Notice: Subject to any disclaimer, the term of this patent is extended or adjusted under 35 U.S.C. 154(b) by 0 days.

(21) Appl. No.: 14/559,242

(22) Filed: Dec. 3, 2014

(65) Prior Publication Data

US 2015/0177508 A1    Jun. 25, 2015

(30) Foreign Application Priority Data

Dec. 20, 2013    (DE) .......................... 10 2013 022 018

(51) Int. Cl.
| | |
|---|---|
| G01B 11/26 | (2006.01) |
| G02B 23/16 | (2006.01) |
| G01C 1/02 | (2006.01) |
| G01C 15/00 | (2006.01) |

(52) U.S. Cl.
CPC ................ *G02B 23/16* (2013.01); *G01B 11/26* (2013.01); *G01C 1/02* (2013.01); *G01C 15/00* (2013.01)

(58) Field of Classification Search
CPC ............ G01C 1/02; G01C 3/04; G01C 17/00; G01B 3/56; G01B 3/00; G01P 1/02; G01P 1/00; G08G 1/0968
USPC ......... 356/140, 141.1, 625, 614, 138; 348/135
See application file for complete search history.

(56) References Cited

U.S. PATENT DOCUMENTS

| | | | | |
|---|---|---|---|---|
| 7,099,000 | B2 * | 8/2006 | Connolly | G01C 15/002 33/285 |
| 7,228,641 | B2 * | 6/2007 | Hunter | F16C 17/08 33/556 |
| 7,697,120 | B2 * | 4/2010 | Reichert | G01S 7/4813 356/3.01 |
| 7,793,424 | B2 * | 9/2010 | Laabs | G01C 15/002 33/290 |
| 8,525,983 | B2 * | 9/2013 | Bridges | G01B 11/03 356/138 |
| 2009/0109420 | A1 * | 4/2009 | Kludas | G01C 15/002 356/3.01 |
| 2009/0138233 | A1 * | 5/2009 | Kludas | G01S 15/00 702/158 |

FOREIGN PATENT DOCUMENTS

| | | |
|---|---|---|
| DE | 1741373 U | 7/1955 |
| DE | 3300236 A1 | 7/1984 |
| EP | 2607843 A1 | 6/2013 |

* cited by examiner

*Primary Examiner* — Tarifur Chowdhury
*Assistant Examiner* — Isiaka Akanbi
(74) *Attorney, Agent, or Firm* — Kilpatrick Townsend & Stockton LLP

(57) ABSTRACT

An optical measurement system comprises a first housing body and a second housing body which can be rotated relative to the first housing body about a second axis of rotation, wherein the second housing body contains a measurement telescope, an inner roller bearing support fixed to the second housing body and protruding into the first housing body; an outer roller bearing support fixed to the first housing body; a drive disc fixed to the inner roller bearing support; wherein a motor having a motor shaft is attached to the first housing body in such a way that the motor shaft or a wheel fixed to the motor shaft is positioned on the drive disc and is pressed against said disc by a spring force orientated transversely to the second axis of rotation, and wherein the motor shaft or the wheel is coupled to the drive disc in a frictional fit.

20 Claims, 8 Drawing Sheets

OPTICAL MEASURING SYSTEM

CROSS-REFERENCE TO RELATED APPLICATIONS

This application claims priority to German Application No. 10 2013 022 018.1, filed Dec. 20, 2013, the entire contents of which are incorporated herein by reference in their entirety for all purposes.

The present invention relates to optical measurement systems, for example optical measurement systems for angle measurement in the field of geodesy, theodolites, total stations or the like.

For angle measurement in the field of geodesy, optical measurement systems are frequently used. These measurement systems are distinguished in that the angle measurement can be carried out with a very high level of precision. To achieve the required precision, the measurement systems themselves must be manufactured highly precisely. Optical measurement systems of this type, such as theodolites, total stations or the like, usually comprise at least a measurement telescope and a housing body, which can be rotated relative to one another about an axis of rotation. Usually, the measurement telescope is mounted on opposite sides of the measurement telescope by a shaft in the housing body. If this shaft is in a single piece and mounted in the housing body at both ends, the measurement axis of the measurement telescope is arranged eccentrically with respect to the shaft, in such a way that rotating the shaft displaces the measurement telescope in position and orientation. The simultaneous displacement of the position and orientation of the measurement telescope when the shaft rotates has a negative effect on the measurement process and the measurement precision. Alternatively, the measurement telescope is conventionally mounted in the housing body by journal shafts arranged on opposite sides of the measurement telescope, in such a way that the measurement axis of the measurement telescope is displaced exclusively in orientation, but not in position, when the journal shafts rotate. However, it is expensive to produce and adjust a measurement telescope mounted by two journal shafts.

An object of the present invention is therefore to propose an optical measurement system which overcomes the aforementioned drawbacks of mounting a measurement telescope in a housing body.

In embodiments of the invention, an optical measurement system comprises a base; a first housing body which can be rotated relative to the base about a first axis of rotation; and a second housing body which can be rotated relative to the first housing body about a second axis of rotation; the first axis of rotation and the second axis of rotation being orientated transversely, in particular orthogonally, to one another; the second housing body containing a measurement telescope, the measurement axis of which is orientated transversely, in particular orthogonally, to the second axis of rotation; the measurement system further comprising: an inner roller bearing support fixed to the second housing body and protruding into the first housing body; an outer roller bearing support fixed to the first housing body; a first roller bearing and a second roller bearing, the inner rings of which are fixed to the inner roller bearing support at a distance from one another, symmetrically about the second axis of rotation, outer rings of the roller bearings being fixed to the outer roller bearing support, the first and second roller bearings being biased in an O arrangement; a drive disc fixed to the inner roller bearing support; a motor having a motor shaft; the motor being attached to the first housing body in such a way that the motor shaft or a wheel fixed to the motor shaft is positioned on the drive disc and is pressed against said disc by a spring force orientated transversely, in particular orthogonally, to the second axis of rotation, the motor shaft or the wheel being coupled to the drive disc in a frictional fit, and no further bearings, in particular roller bearings, being provided aside from the first and second roller bearings to mount the second housing body relative to the first housing body.

As a result, the second housing body, which contains the measurement telescope, is mounted in the first housing body merely on one side, and, apart from the first and second roller bearings, the measurement system is free of further bearings which are used for mounting the second housing body relative to the first housing body. When the second housing body is rotated about the second axis of rotation relative to the first housing body, the measurement axis of the measurement telescope can be displaced exclusively in orientation but not in position, making simple, precise angle measurement possible. As a result of the first and second roller bearings being biased in an O arrangement, the inner roller bearing support is arranged stably and rotatably in the outer roller bearing support, ensuring the required precision during the rotation of the first housing body relative to the second housing body. In addition, the manufacture of the one-sided mounting of the second housing body in the first housing body is simpler and more favourable than a two-sided mounting, for example by way of a single-piece shaft or two journal shafts. A drive disc is fixed to the inner roller bearing support and is coupled in a frictional fit, in particular not in a positive fit, to a motor shaft of a motor or to a wheel fixed to the motor shaft, so as to displace the orientation of the inner roller bearing support, and thus the orientation of the second housing body relative to the outer roller support bearing and thus relative to the first housing body, in a controllable manner.

The first housing body may be mounted in the base in the same way, it being possible for the inner roller bearing support to be fixed to the first housing body and the outer roller bearing body to be fixed to the base or for the inner roller bearing support to be fixed to the base and the outer roller bearing support to be fixed to the first housing body, and all further components being arranged analogously in relation to the arrangement of the roller bearing supports, in such a way that the first housing body is likewise mounted rotatably relative to the base and is adjustable by a friction wheel drive.

In exemplary embodiments, the drive disc may consist of a plastics material, in particular PET, or ceramics and have a rubberised surface. Further, the drive disc may comprise a tyre of a plastics material, in particular PET or a rubber, against which the motor shaft or the wheel is pressed. As a result, it is possible to set the required friction between the drive disc and the motor shaft. The tyre is thus directly in contact with the motor shaft or a wheel fixed to the motor shaft. The tyre and the drive disc may consist of one piece.

In exemplary embodiments, the motor shaft or the wheel consists of metal.

In exemplary embodiments, the motor shaft is orientated substantially parallel to the second axis of rotation. In this arrangement, the area between the motor shaft or the wheel and the drive disc, via which the frictional forces are transmitted, is large, leading to a particularly good frictional fit between the motor shaft or the wheel and the drive shaft.

In exemplary embodiments, the motor is attached to the first housing body in such a way that the motor shaft is freely pivotable about at least one pivot axis, which is orientated transversely, in particular orthogonally, to the second axis of rotation. As a result, the motor shaft or the wheel can be orientated optimally with respect to the drive disc. In particular, two pivot axes about which the motor is freely pivotable may be provided, the two pivot axes and the two axes of rotation being orientated transversely, in particular substantially orthogonally, to one another.

Further, damping elements may be arranged in or on components of the friction wheel drive, in particular the motor or a suspension of the motor, so as to damp vibrations and oscillations of the friction wheel drive.

In exemplary embodiments, the first and second roller bearings, as seen in the direction of the second axis of rotation, are arranged between the second housing body and the drive disc. As a result, the inner roller bearing support is arranged stably and rotatably relative to the outer roller bearing support.

In exemplary embodiments, the optical measurement system further comprises an angle measurement system for measuring a rotational position of the second housing body relative to the first housing body about the second axis of rotation. As a result, the rotational position of the second housing body relative to the first housing body, in other words the orientation of the second housing body relative to the first housing body, about the second axis of rotation can be measured.

In further exemplary embodiments, the angle measurement system comprises an encoder disc, which is fixed to the inner roller bearing support, and a sensor, which senses the encoder disc and is fixed to the outer roller bearing support.

In further exemplary embodiments, the encoder disc, as seen in the direction of the second axis of rotation, is arranged between the drive disc and the first roller bearing. This configuration makes high-precision determination of the rotational position of the second housing body relative to the first housing body about the second axis of rotation possible, since the encoder disc is fixed to the inner roller bearing support at a point which is particularly resistant to tilts of the inner roller bearing support, in other words has a particularly stable orientation.

In further exemplary embodiments, the encoder disc may consist of a glass, a ceramic or a plastics material. As a result, the encoder disc can be relatively light and resistant for example to temperature fluctuations.

In further exemplary embodiments, the optical measurement system further comprises a control system, which drives the motor as a function of measurement signals of the angle measurement system. As a result, a control circuit can be implemented which for example keeps the rotational position of the second housing body in a stable rotational position relative to the first housing body about the second axis of rotation or adjusts it by a predetermined amount. In this way, the control system can act as a self-regulation system.

In exemplary embodiments, the first and second roller bearings are each formed as a ball bearing or the like.

In exemplary embodiments, a ratio between the diameter of the roller body and a maximum distance between two roller bodies of a roller bearing in the first and second roller bearings is less than 0.15, in particular less than 0.07. As a result, high stability between the inner ring and the outer ring of each first and second roller bearing is ensured, increasing the stability and precision of the mounting of the inner roller bearing support.

Further, the outer roller bearing support and the outer rings of the roller bearing may be glued together and/or the inner roller bearing support and the inner rings of the roller bearing may be glued together, so as to eliminate mechanical play.

In exemplary embodiments, the second axis of rotation passes through a light beam, which extends in the measurement telescope and is used for imaging. In particular, when the light which extends in the measurement telescope and is used for imaging is arranged along an optical axis of the measurement telescope, rotating the measurement telescope about the second axis of rotation substantially only displaces the orientation of the light beam, meaning that the measurement process can be carried out simply and precisely.

In exemplary embodiments, the measurement axis intersects the second axis of rotation. When rotated about the second axis of rotation, the measurement axis is thus displaced exclusively centrically about the second axis of rotation, this being particularly advantageous for the measurement process.

In exemplary embodiments, the measurement axis intersects the first axis of rotation. When rotated about the first axis of rotation, the measurement axis is thus displaced exclusively centrically about the first axis of rotation, this being particularly advantageous for the measurement process.

In exemplary embodiments, the first housing body is of an L-shaped formation. As a result, the second housing body and/or the measurement telescope can be fixed and adjusted particularly simply on the inner roller bearing support.

In exemplary embodiments, the first housing body comprises a first housing part, which extends parallel to the first axis of rotation and is arranged at a distance from the first axis of rotation and on which the outer rings of the roller bearings are fixed.

In further exemplary embodiments, the first housing body comprises a second housing part, which extends parallel to the first axis of rotation and is arranged opposite the first housing part with respect to the first axis of rotation. As a result, further components can be arranged in the second housing part of the first housing body. In this configuration, the first housing body is of the conventional U-shaped formation.

In further exemplary embodiments, the second housing body, as seen in the direction of the second axis of rotation, is arranged between the first and second housing parts of the first housing body. As a result, the second housing body, which contains the measurement telescope, is enclosed by the first and the second housing part, meaning that the second housing body is protected in part from external influences.

In further exemplary embodiments, the second housing part contains a battery.

Further features of the invention may be taken from the following description of embodiments in connection with the claims and the drawings. In the drawings, like or similar elements are denoted by like or similar reference numerals. It is noted that the invention is defined by the scope of the accompanying claims, and is not limited to the embodiments of the disclosed examples. In particular, the individual features of embodiments according to the invention may be implemented in different numbers and combinations from in the examples discussed in the following. The following description of an embodiment of the invention makes reference to the accompanying drawings, of which embodiments of the invention are described in the following by way of drawings, in which:

Figure 1:
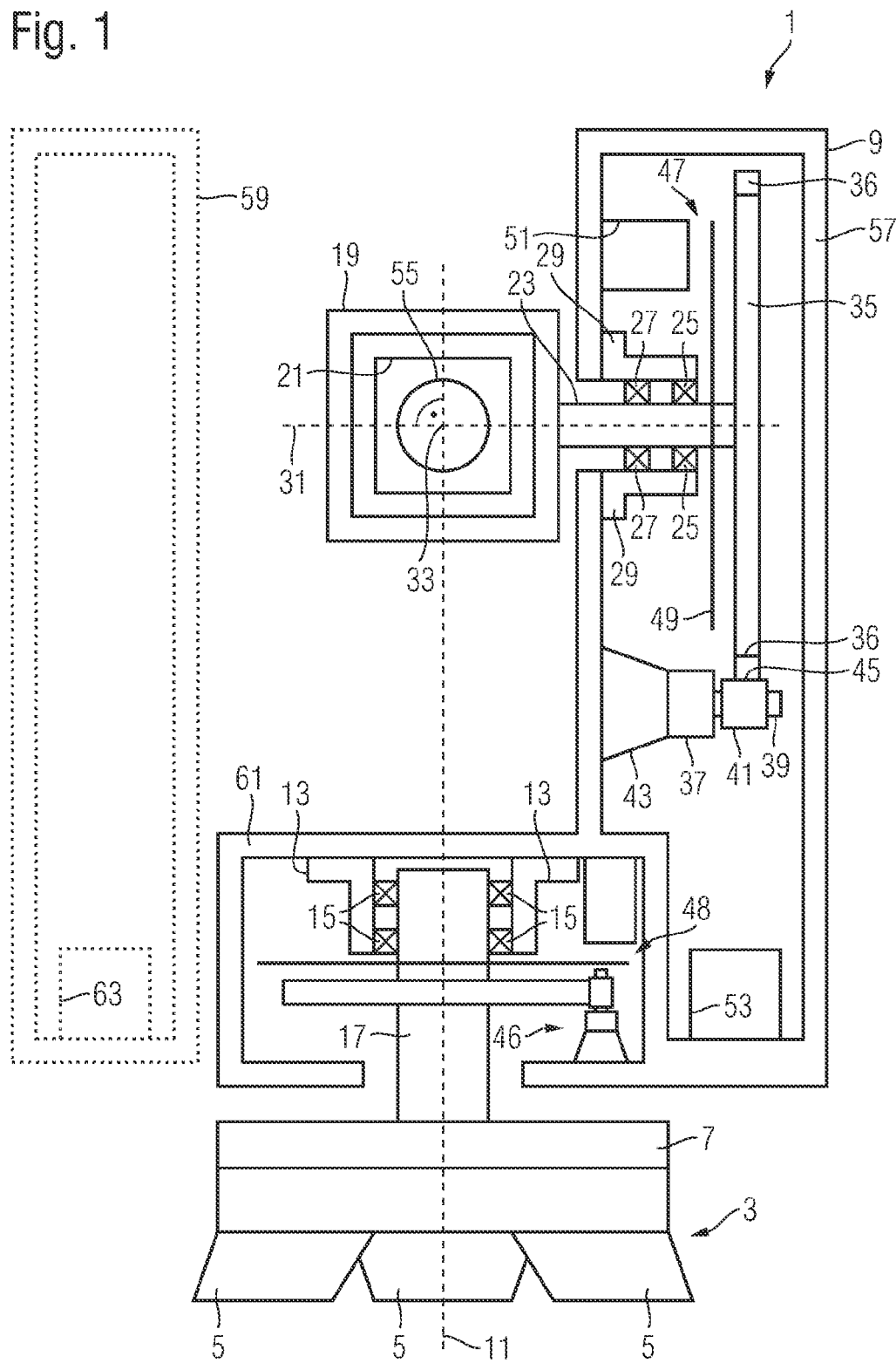
FIG. 1 is a schematic sectional drawing of an optical measurement system.

FIG. 1 is a schematic drawing of an optical measurement system 1, which may for example be a theodolite, a tachymeter or a total station. The optical measurement system is mounted on a tripod 3 having three legs 5. The optical measurement system comprises a base 7, which is attached to the tripod. A first housing body 9 is rotatable relative to the base 7 about a first axis of rotation 11 in that an outer roller bearing support 13 is rigidly connected to the first housing body symmetrically about the first axis of rotation 11 and an inner roller bearing support 17, which is rigidly connected to the base 7 symmetrically about the first axis of rotation 11, are mounted rotatably relative to one another via two roller bearings 15. The optical measurement system further comprises a second housing body 19, which contains a measurement telescope 21. The second housing body 19 is rigidly connected to an inner roller bearing support 23, which protrudes into the first housing body 9. The inner roller bearing support 23 is mounted rotatably about a second axis of rotation 31 relative to an outer roller bearing support 29 by a first roller bearing 25 and a second roller bearing 27, the outer roller bearing support 29 being rigidly connected to the first housing body 9. In particular, aside from the first and second roller bearings, the measurement system is free of further roller bearings which are used for mounting the second housing body relative to the first housing body. The inner roller bearing support 23, the first roller bearing 25, the second roller bearing 27 and the outer roller bearing support 29 are arranged symmetrically about the second axis of rotation 31. The first axis of rotation 11 and the second axis of rotation 31 are orientated orthogonally to one another. In addition, a measurement axis 33, extending perpendicular to the plane of the drawing in FIG. 1, of the measurement telescope 21 is orientated orthogonally to the second axis of rotation. Thus, the measurement telescope 21 contained in the second housing body 19 and the measurement axis 33 thereof are mounted rotatably about the first axis of rotation 11 and the second axis of rotation 31.

Further, a drive disc 35 is fixed to the inner roller bearing support 23, and is used for controlling and regulating a rotational position of the inner roller bearing support 23. The drive disc 35 comprises a tyre 36, which consists of a plastics material, in particular PET or a rubber, and which is directly in contact with the wheel.

The optical measurement system 1 further comprises a motor 37 having a motor shaft 39. A wheel 41 is attached to the motor shaft 39, and the motor 37 is attached to the first housing body 9 by way of a suspension 43 in such a way that either the wheel 41 fixed to the motor shaft or the motor shaft 39 itself is positioned on the drive disc, the motor shaft 39 or the wheel 41 being pressed against the drive disc 35 by spring force orientated transversely to the second axis of rotation 31. As a result, the motor shaft 39 or the wheel 41 is coupled to the drive disc 35 by frictional fit, in other words a transfer of frictional forces and torques between the motor shaft 39 or the wheel 41 and the drive disc 35 by friction is made possible. By contrast with a coupling using gearwheels, in this embodiment the coupling is achieved exclusively by frictional fit and not by positive fit. An exact configuration of the transmissible torques can be set for example by selecting the materials of the motor shaft 39 or of the wheel 41 and of the drive disc 35 or of the tyre 36 attached to the drive disc. In particular, the motor shaft 39 or the wheel 41 may consist of metal.

As is shown in FIG. 1, the motor shaft 39 is orientated parallel to the second axis of rotation 31. As a result, a contact area 45 between the motor shaft 39 or the wheel 41 and the drive disc 35 or the tyre 36 is large, meaning that the frictional fit is formed particularly advantageously.

For displacing the first housing body 9 relative to the base 7, the measurement system further comprises a drive 46, which may in particular be constructed analogously to the above-disclosed friction wheel drive.

To mount the measurement telescope 21 contained in the second housing body 19 in a stable and rotatable manner in the first housing body 9, the first roller bearing 25 and the second roller bearing 27, as seen in the direction of the second axis of rotation 31, are preferably arranged between the second housing body 19 and the drive disc 35.

The optical measurement system 1 further comprises an angle measurement system 47, by means of which a rotational position of the second housing body 19 relative to the first housing body 9 about the second axis of rotation 31 can be measured. In this embodiment, the angle measurement system 47 comprises an encoder disc 49, which is fastened to the inner roller bearing support 23, and a sensor 51, which senses the encoder disc and is fixed to the first housing body 9. Alternatively, the sensor 51 may also be fixed to the outer roller bearing support 29.

The angle measurement system 47 is completely enclosed by the first housing body 9, meaning that the angle measurement system 47 is protected from external influences, for example dust, moisture or the like. Preferably, the encoder disc 49, as seen in the direction of the second axis of rotation 31, is arranged between the drive disc 35 and the first roller bearing 25. As a result, the encoder disc 49 is fixed to a position on the inner roller bearing support 23, which is particularly stable as regards tilting of the inner roller bearing support 23 in the context of mechanical play, this contributing to the precision of the angle measurement.

The optical measurement system 1 further comprises an angle measurement system 48 which is used for determining the relative rotational position of the first housing body 9 and the base 7. The angle measurement system 48 may in particular have an analogous construction to the angle measurement system 47.

The optical measurement system further comprises a control system 53, which can drive the motor 37 as a function of measurement signals of the angle measurement system 47. This makes active control and regulation of the rotational position of the second housing body 19 relative to the first housing body 9 possible, in that the control system 53 detects the measurement signals of the angle measurement system 47 and actuates the motor 37 accordingly. In this way, the rotational position can be regulated in such a way that the rotational position is kept constant in spite of being subject to external influences. Alternatively, the rotational position can be adjusted through a predetermined angle by way of the control/regulation.

As is shown in FIG. 1, the measurement telescope 21 and the second axis of rotation 31 may be arranged in such a way that a light beam 55, which extends in the measurement telescope 21 and is used for imaging, is passed through by the second axis of rotation 31. It is particularly advantageous if, as shown in FIG. 1, the measurement axis 33 of the measurement telescope 21 intersects the second axis of rotation 31. As a result, when the measurement telescope 21 is rotated about the second axis of rotation 31, the measurement axis is rotated concentrically with the second axis of rotation, and this is particularly advantageous for an angle measurement process. It is further preferred for the measurement axis 33 to intersect the first axis of rotation, as is shown in FIG. 1.

The first housing body 9 is of an L-shaped formation, the first housing body 9 comprising a first housing part 57 which extends substantially parallel to the first axis of rotation 11 and is arranged at a distance from the first axis of rotation 11. The first housing body further comprises a second housing part 59, which extends substantially parallel to the first axis of rotation 11 and is arranged opposite the first housing part 57 with respect to the first axis of rotation 11. The second housing part 59 may comprise further components, and can be fixed to a third housing part 61, which is rigidly connected to the first housing part 57. As is shown in FIG. 1, the second housing body 19, as seen in the direction of the second axis of rotation 31, is arranged between the first housing part 57 and the second housing part 59 of the first housing body 9. In this embodiment, the second housing part 59 contains a battery 63, which can be used for example for powering the control system 53 or as an energy source for the motor 37.

Figure 2:
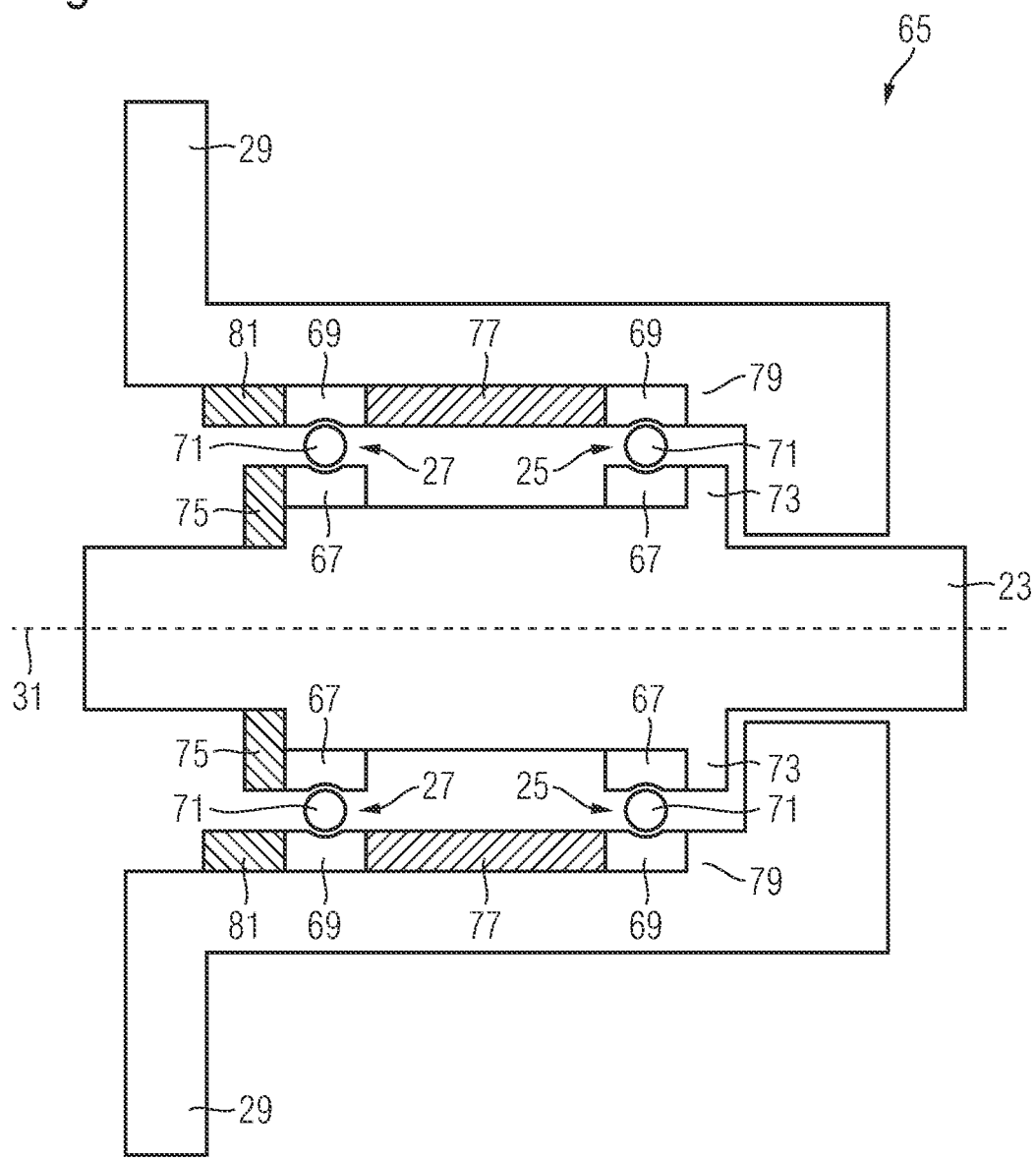
FIG. 2 is a schematic drawing of a roller bearing unit of the optical measurement system of FIG. 1.

FIG. 2 is a schematic drawing of a roller bearing unit 65 of the optical measurement system 1 of FIG. 1. The roller bearing unit 65 comprises the inner roller bearing support 23, the outer roller bearing support 29, the first roller bearing 25 and the second roller bearing 27. The first and the second roller bearing each comprise inner rings 67, outer rings 69 and roller bodies 71. The inner rings 67 of the first and second roller bearings are fixed to the inner roller bearing support 23 at a distance from one another, symmetrically about the second axis of rotation 31. The outer rings 69 of the first and second roller bearings are fixed to the outer roller bearing support 29. The inner roller bearing support 23 comprises a projection perpendicular to the second axis of rotation 31, on which the inner ring 67 of the first roller bearing 25 is positioned, and fixes it in position in the direction of the projection. The roller bearing unit 65 further comprises a fastening 75, which is fastened to the inner roller bearing support 23, is arranged opposite the projection 73 as seen in the direction of the second axis of rotation 31, and is positioned on the inner ring 67 of the second roller bearing 27. The outer rings 69 of the first and second roller bearings are arranged spaced apart from one another by a spacer ring 77 or the like in the direction of the second axis of rotation 31, the spacer ring 77 being positioned both on the outer ring 69 of the first roller bearing 25 and on the outer ring 69 of the second roller bearing 27. The outer rings 69 and the spacer ring 77 are fixed in position by a projection 79 of the outer roller bearing support 29 and a fastening which can be fixed to the outer roller bearing support 29 and which is positioned on the outer ring 69 of the second roller bearing 27. By contrast with the outer rings 69, the inner rings 67 are not spaced apart from one another by a spacer ring or the like, in such a way that the inner rings 67 of the first and second roller bearings can be biased by the projection 73 and the fastening 75. By biasing the inner rings, it is possible to achieve high stability of the roller bearing unit 65 against for example tilting and mechanical play.

Figure 3:
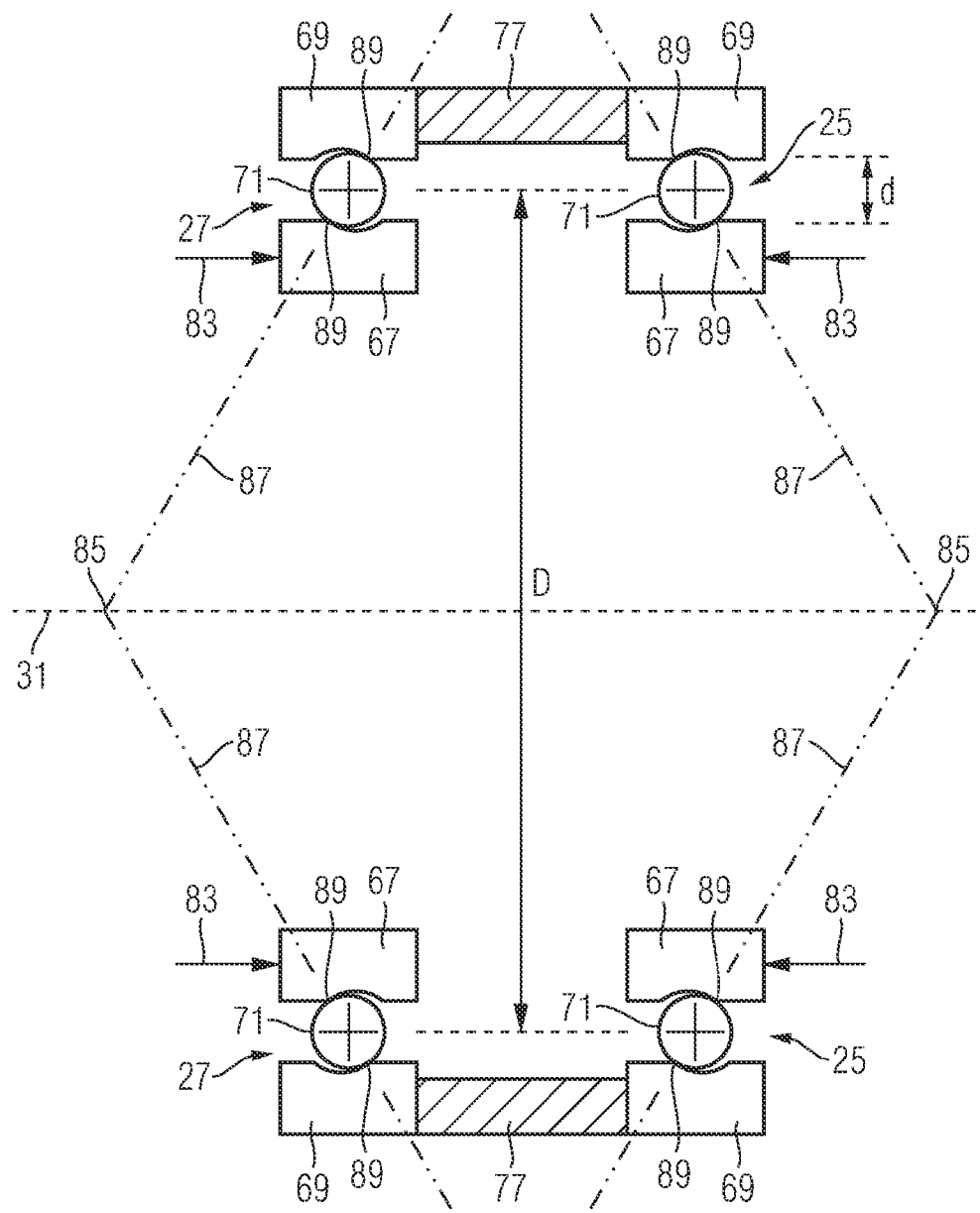
FIG. 3 is a schematic drawing illustrating geometrical relations of the roller bearing unit of FIG. 2, and FIGS. 4 to 8 show different configurations of a suspension which couples a motor shaft to a drive disc.

FIG. 3 is a schematic drawing illustrating the geometric relations of the roller bearing unit of FIG. 2, showing a configuration of a bias of the roller bearing unit 65 in an O arrangement. As disclosed previously in relation to FIG. 2, the outer rings 69 of the first and second roller bearings and the spacer ring 77 are fixed in position. The bias of the inner rings 67 is achieved by a suitable arrangement of the fastening 75 shown in FIG. 2 and the projection 73, causing a force, shown in FIG. 3 using arrows 83, to act on the inner rings parallel to the second axis of rotation 31, the forces being directed towards one another in this direction and the inner bearings thus being pressed towards one another. As a result of this force, the roller body 71 is pressed on the inner ring and the outer ring on opposite sides of the roller body, virtually completely eliminating the mechanical play of the roller bearing and increasing the precision of the roller bearing unit. The length between the intersection points 85 of the second axis of rotation 31 with the contact lines 87 is a measure of the stability and precision of the roller bearing unit 65, a larger length corresponding to a higher precision and stability. The contact lines 87 are defined by the contact points 89 at which the roller bearings 71 impact on the inner rings and outer rings. The arrangement shown here of the resulting contact lines 87 corresponds to a bias in an O arrangement.

A ratio of a diameter d of the roller body 71 to a maximum distance D between two roller bodies in the first roller bearing 25 and the second roller bearing 27 may take values which are particularly advantageous for stable mounting. Said ratio is particularly advantageous if it is less than 0.15, in particular less than 0.07.

The roller bearings may for example be configured as ball bearings or the like, and may in particular be identical.

Figure 4:
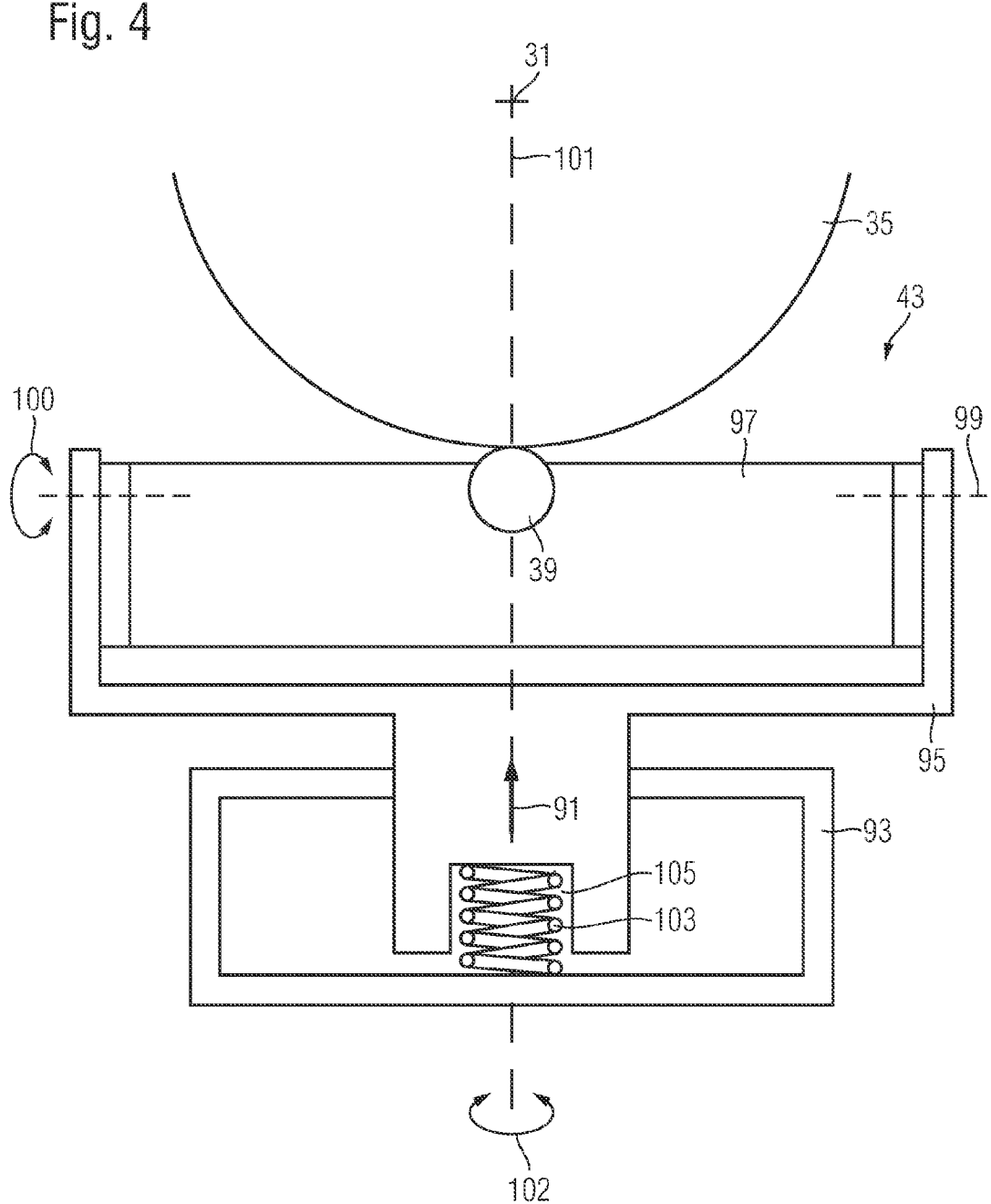

FIG. 4 shows a configuration of a suspension which presses the motor shaft 39 against the drive disc 35 by spring force, the spring force being directed in the direction indicated by the arrow 91, which is orientated orthogonally to the second rotational axis 31 extending perpendicular to the plane of the drawing in FIG. 4. In this embodiment, the suspension 43 comprises a suspension housing 93, a fork 95 and a lever 97. The lever 97 is mounted rotatably relative to the fork 95 about a first suspension axis of rotation 99. The fork 95 is mounted rotatably relative to the suspension housing 93 about a second suspension axis 101, the first suspension axis and the second suspension axis being orientated preferably mutually orthogonally. The suspension housing 93 further comprises a spring 103, which is arranged in part in a channel 105 in the fork 95 in such a way that the fork 95 is pressed in the direction indicated by the arrow 91 along the second suspension axis 101 relative to the suspension housing 93. The suspension housing 93 is attached to the first housing body 9 in such a way that the motor 37 is attached to the first housing body 9 by way of the suspension 43 in such a way that the motor shaft 39 is pivotable about at least one pivot axis which is orientated orthogonally to the second axis of rotation. The suspension 43 shown in FIG. 4 comprises two pivot axes, the first suspension axis 99 and the second suspension axis 101, which make pivoting of the motor shaft 39 possible, both pivot axes being orientated orthogonally to the second axis of rotation 31, which extends perpendicular to the plane of the drawing in FIG. 4. The pivotability about the pivot axis 99 and the pivot axis 101 is illustrated by an arrow 100 and an arrow 102 respectively.

Figure 5:
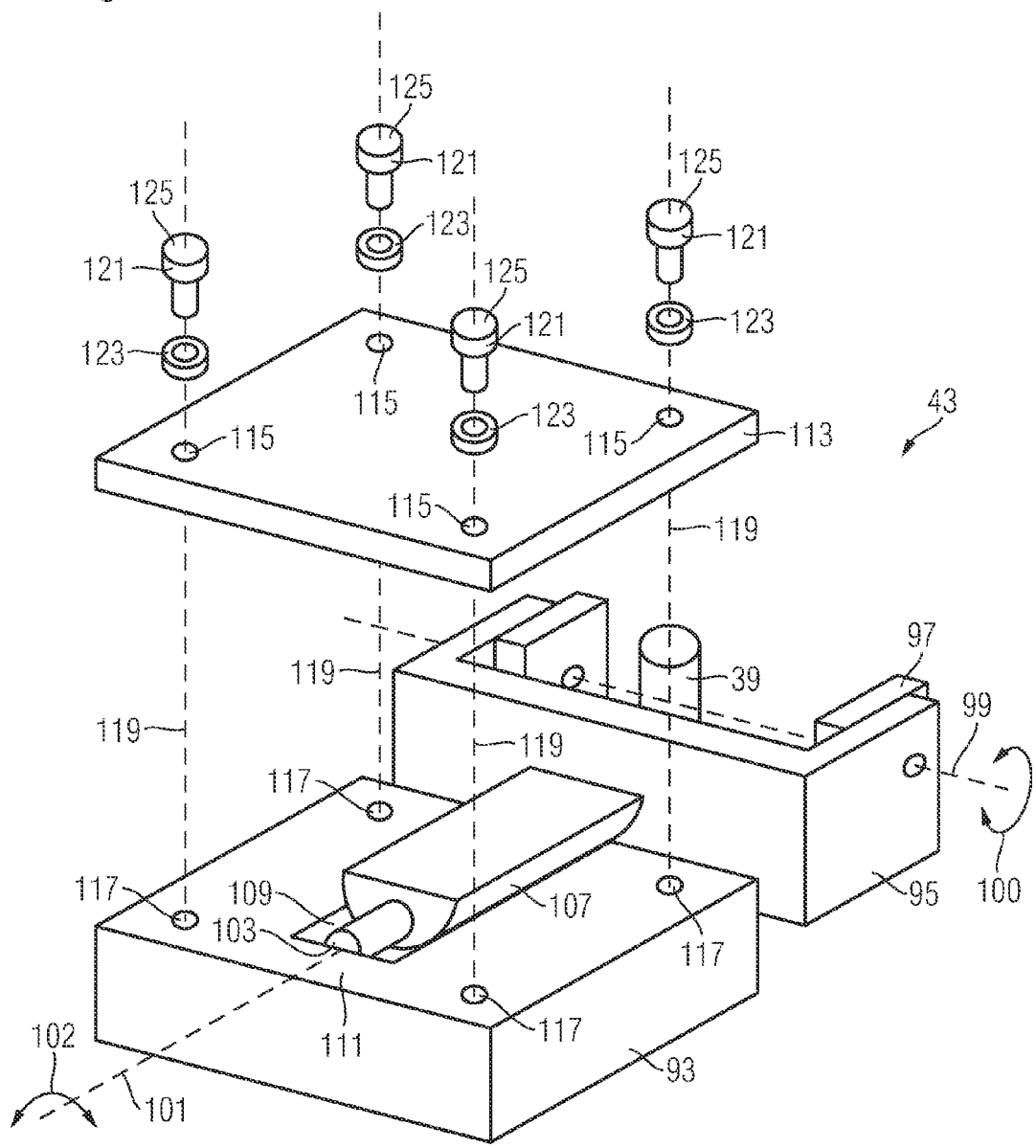

FIG. 5 shows a further embodiment of the measurement system described by way of FIGS. 1-4, and differs in the configuration of the suspension in that merely a freely pivotable pivot axis is provided for pivoting the motor shaft 39. The motor comprising the motor shaft 39 is attached to a lever 97, which is mounted in a fork 95 rotatably about a first suspension axis of rotation 99, making the motor shaft 39 pivotable about the first suspension axis of rotation 99, this being illustrated by an arrow 100. The fork comprises a shaft 107 of a semi-cylindrical cross section, it alternatively being possible for the cross section to be rectangular or trapezoidal. The shaft 107 extends substantially perpendicular to the first suspension axis of rotation 99 and protrudes into a suspension housing 93. The suspension housing 93 comprises a channel 109 having a V-shaped cross section, in which channel the side of the shaft 107 having the semi-circular cross section is arranged. A spring 103 is arranged between a lower part 111 of the suspension housing 93 and the shaft 107 in such a way that the spring exerts a force, which is directed along a second suspension axis of rotation 101, on the shaft. In this embodiment, the suspension 43 further comprises a plate 113, which comprises through-holes 115. The through-holes 115 overlap with threads 117 arranged in the suspension housing 93, this being illustrated by reference lines 119. The plate 113 may be connected to the suspension housing 93 using screws 121 fitted to the threads 117, spring rings or alternatively spiral springs 123 being arranged between screw heads 125 and the plate 113 in such a way that the spring rings or spiral springs 123 press the plate 113 against the planar side, projecting out of the suspension housing 93, of the shaft 107. As a result, the fork 95 only remains minimally pivotable about the second suspension axis of rotation 101, this being illustrated by an arrow 102.

Figure 6:
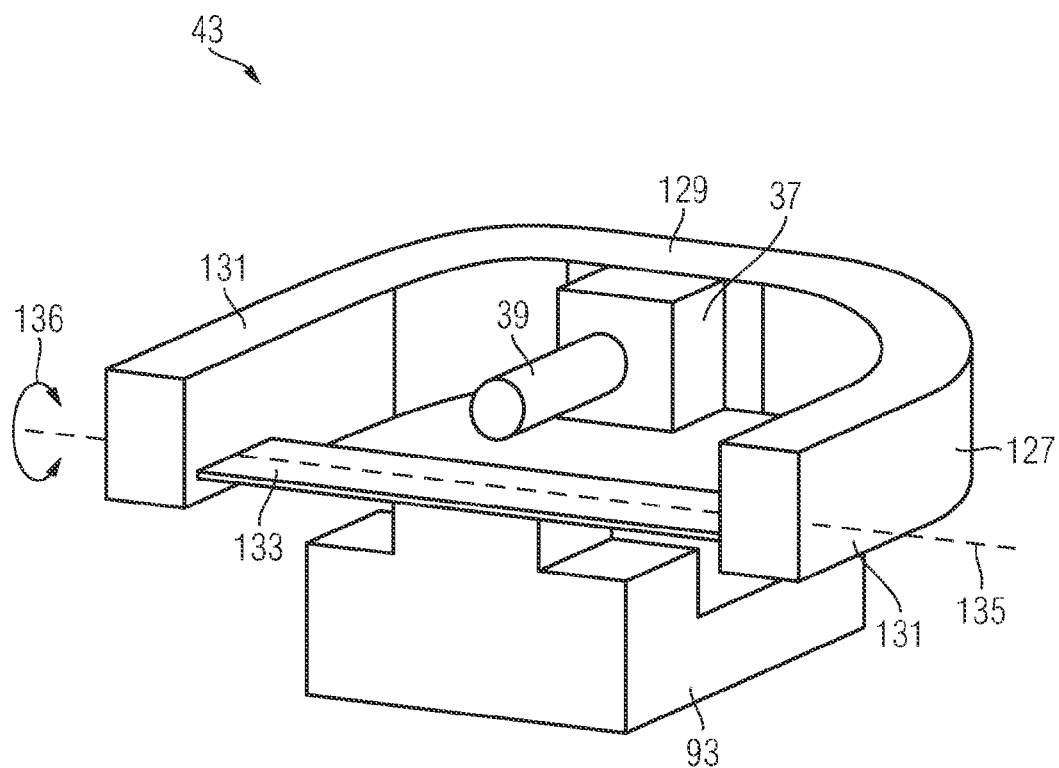

FIG. 6 shows a further embodiment of the measurement system described by way of FIGS. 1-4, and differs therefrom merely in the configuration of the suspension 43. The motor 37 and the motor shaft 39 thereof are rigidly connected to a suspension part 127. The suspension part 127 preferably comprises a suspension part base 129 and two suspension part arms 131, the suspension part base 129 being rigidly connected to and arranged between the suspension part arms 131. Preferably, the motor 37 is rigidly connected to the suspension part base 129. The suspension part 127 is connected to a leaf spring 133, the leaf spring preferably being arranged between the suspension part arms 131. Further, the leaf spring 133 is rigidly connected to a suspension housing 93. The suspension housing 93, the leaf spring 133 and the suspension part 127 are configured in such a way that the suspension part 127 is pivotable or rotatable at least in part relative to the suspension housing 93 about at least one axis 135, this being illustrated by an arrow 136.

Figure 7:
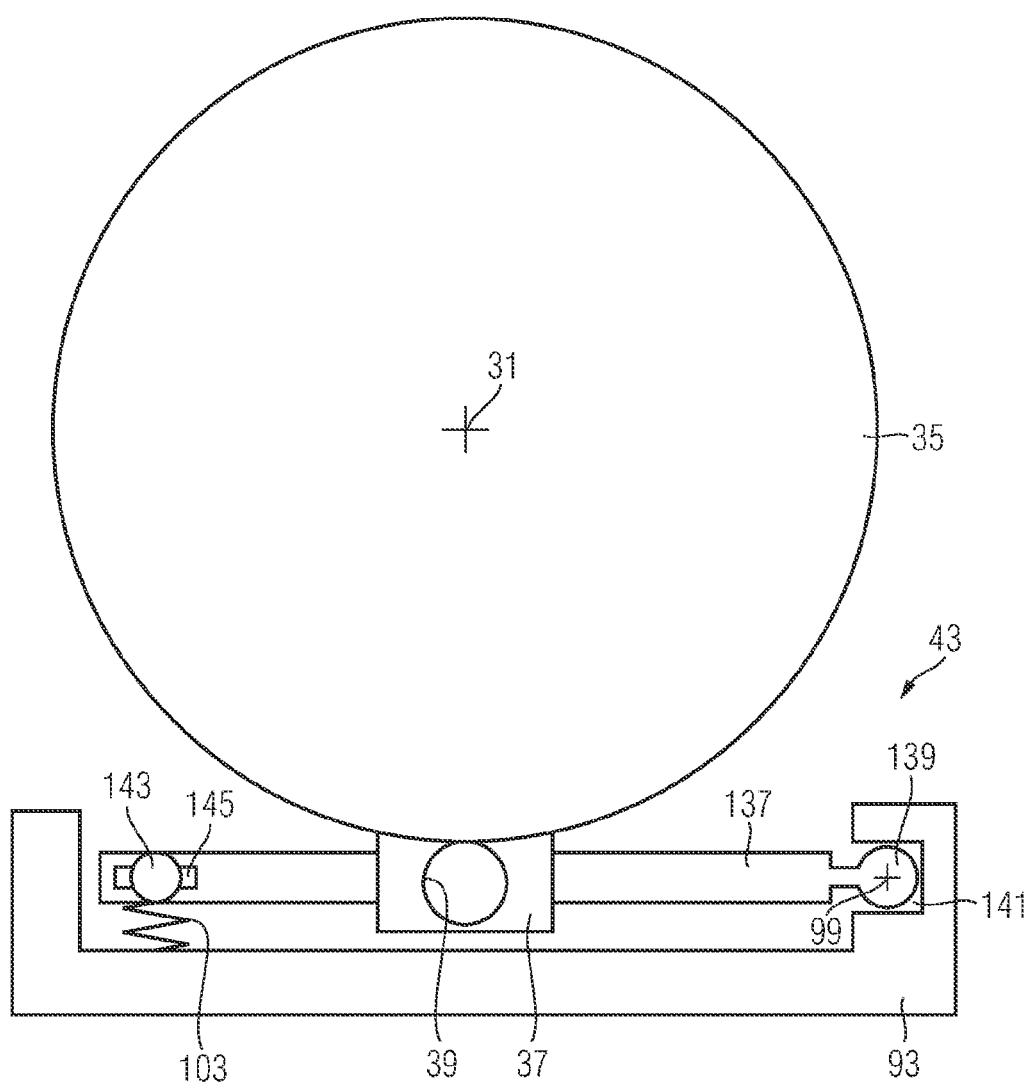

FIG. 7 shows a further embodiment of the measurement system described by way of FIGS. 1-4, and differs therefrom merely in the configuration of the suspension 43. The motor 37 is rigidly connected to a joint 137, the articulation preferably being rod-shaped and the motor in this case being arranged centrally on the joint 137. On the one hand, the joint 137 comprises a ball joint 139 which is arranged in a channel 141 provided therefor of the suspension housing 93. On the other hand, the joint 137 is connected to the suspension housing 93 by way of a spring 103 in such a way that the spring 103 presses the motor shaft 39 of the motor 37 against the drive disc 35, the force being orientated substantially in a direction perpendicular to the second axis of rotation 31, which is orientated perpendicular to the plane of the drawing of FIG. 7. The spring 103 is connected to the joint 137 by a pin 143, the pin 143 being arranged movably within a recess 145 of the joint 137.

Figure 8:
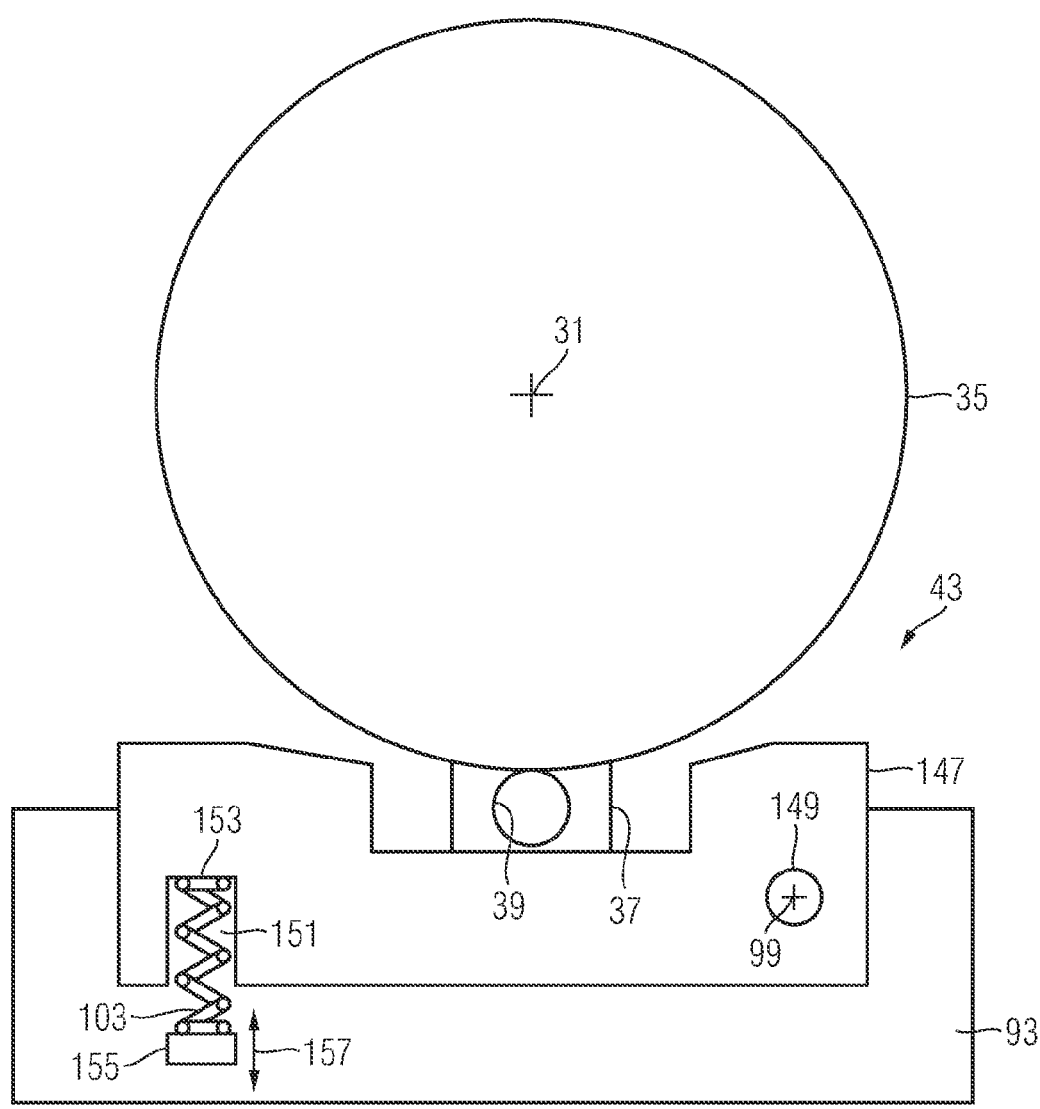

FIG. 8 shows a further embodiment of the measurement system described by way of FIGS. 1-4, and differs therefrom merely in the configuration of the suspension 43. The motor 37 is rigidly connected to a joint 147. The joint 147 is mounted pivotally about the pivot axis 99 relative to the suspension housing 93 by an articulated connection 149, the pivot axis 99, the motor shaft 39 and the second axis of rotation 31 being orientated substantially mutually parallel. The spring 103 may, as shown, be arranged in part in a recess 151 of the joint 147. One end of the spring 103 is positioned against a face 153 of the joint 147, the articulated connection 149, the face 153 and the spring 103 being orientated with respect to one another in such a way that the spring force of the spring 103 presses the joint 147 and thus also the motor shaft 39 against the drive disc 35. The other end of the spring 103 is held by a counter mounting 155, the counter mounting 155 being adjustable in position as is shown by the arrow 157.

The invention claimed is:

1. Optical measurement system, comprising:
 a base,
 a first housing body which can be rotated relative to the base about a first axis of rotation;
 a second housing body which can be rotated relative to the first housing body about a second axis of rotation;
 wherein the first axis of rotation and the second axis of rotation are orientated transversely to one another;
 wherein the second housing body contains a measurement telescope, the measurement axis of which is orientated transversely to the second axis of rotation;
 wherein the measurement system further comprises:
  an inner roller bearing support fixed to the second housing body and protruding into the first housing body;
  an outer roller bearing support fixed to the first housing body;
  a first roller bearing and a second roller bearing, the inner rings of which are fixed to the inner roller bearing support at a distance from one another, symmetrically about the second axis of rotation, wherein outer rings of the roller bearings are fixed to the outer roller bearing support, wherein the first and the second roller bearing are biased in an O arrangement;
  a drive disc fixed to the inner roller bearing support;
  a motor having a motor shaft;
  wherein the motor is attached to the first housing body in such a way that the motor shaft or a wheel fixed to the motor shaft is positioned on the drive disc and is pressed against said disc by a spring force orientated transversely to the second axis of rotation,
  wherein the motor shaft or the wheel is coupled to the drive disc in a frictional fit, and
  wherein no further bearings are provided aside from the first and second roller bearings to mount the second housing body relative to the first housing body.

2. Optical measurement system according to claim 1, wherein the drive disc consists of a plastics material, in particular PET, or ceramics and/or comprises a tyre of a plastics material, in particular PET or a rubber, against which the motor shaft or the wheel is pressed.

3. Optical measurement system according to claim 1, wherein the motor shaft or the wheel consists of metal.

4. Optical measurement system according to claim 1, wherein the motor shaft is orientated substantially parallel to the second axis of rotation.

5. Optical measurement system according to claim 1, wherein the motor is further attached to the first housing body in such a way that the motor shaft is freely pivotable about at least one pivot axis, which is orientated transversely, in particular orthogonally, to the second axis of rotation.

6. Optical measurement system according to claim 1, wherein the first and second roller bearings, as seen in the direction of the second axis of rotation, are arranged between the second housing body and the drive disc.

7. Optical measurement system according to claim 1, further comprising an angle measurement system for measuring a rotational position of the second housing body relative to the first housing body about the second axis of rotation.

8. Optical measurement system according to claim 7, wherein the angle measurement system comprises an encoder disc, which is fixed to the inner roller bearing support, and a sensor, which senses the encoder disc and is fixed to the outer roller bearing support and/or the first housing body.

9. Optical measurement system according to claim 8, wherein the encoder disc, as seen in the direction of the second axis of rotation, is arranged between the drive disc and the first roller bearing.

10. Optical measurement system according to claim 1, further comprising a control system, which drives the motor as a function of measurement signals of the angle measurement system.

11. Optical measurement system according to claim 1, wherein the first and second roller bearings are each a ball bearing.

12. Optical measurement system according to claim 1, wherein a ratio between the diameter of the roller body and a maximum distance between two roller bodies of a roller bearing (D) in the first and second roller bearings is less than 0.15, in particular less than 0.07.

13. Optical measurement system according to claim 1, wherein the second axis of rotation passes through a light beam, which extends in the measurement telescope and is used for imaging.

14. Optical measurement system according to claim 1, wherein the measurement axis intersects the second axis of rotation.

15. Optical measurement system according to claim 1, wherein the measurement axis intersects the first axis of rotation.

16. Optical measurement system according to claim 1, wherein the first housing body is of an L-shaped formation.

17. Optical measurement system according to claim 1, wherein the first housing body comprises a first housing part, which extends parallel to the first axis of rotation and is arranged at a distance from the first axis of rotation and on which the outer rings of the roller bearings are fixed.

18. Optical measurement system according to claim 17, wherein the first housing body comprises a second housing part, which extends parallel to the first axis of rotation and is arranged opposite the first housing part with respect to the first axis of rotation.

19. Optical measurement system according to claim 18, wherein the second housing body, as seen in the direction of the second axis of rotation, is arranged between the first and second housing parts of the first housing body.

20. Optical measurement system according to claim 18, wherein the second housing part contains a battery.

* * * * *